(12) United States Patent
Masich et al.

(10) Patent No.: US 11,190,101 B2
(45) Date of Patent: Nov. 30, 2021

(54) SYSTEM AND METHOD FOR BALANCING CURRENT OF CONVERTER PHASES

(71) Applicant: Lear Corporation, Southfield, MI (US)

(72) Inventors: Antonio Leon Masich, Valls (ES); Ruben Molina Llorente, Valls (ES)

(73) Assignee: Lear Corporation, Southfield, MI (US)

( * ) Notice: Subject to any disclaimer, the term of this patent is extended or adjusted under 35 U.S.C. 154(b) by 451 days.

(21) Appl. No.: 16/174,361

(22) Filed: Oct. 30, 2018

(65) Prior Publication Data

US 2020/0136514 A1 Apr. 30, 2020

(51) Int. Cl.
*H02M 3/158* (2006.01)
*H02M 1/08* (2006.01)
*H02M 1/00* (2006.01)
*H02M 3/157* (2006.01)

(52) U.S. Cl.
CPC .......... *H02M 3/1584* (2013.01); *H02M 1/08* (2013.01); *H02M 1/0009* (2021.05); *H02M 3/157* (2013.01); *H02M 3/1586* (2021.05)

(58) Field of Classification Search
CPC ................. H02M 1/08; H02M 3/1584; H02M 2001/0009; H02M 7/42; H02M 7/44; H02M 7/48; H02M 7/487; H02M 7/515; H02M 7/521; H02M 2003/1586; H02M 3/1586; H02M 3/157; H02M 1/0009; H02M 1/088; H02M 1/084; H02M 1/0025
See application file for complete search history.

(56) References Cited

U.S. PATENT DOCUMENTS

| | | | |
|---|---|---|---|
| 6,392,418 B1 * | 5/2002 | Mir | B62D 5/046 318/716 |
| 7,119,530 B2 | 10/2006 | Mir et al. | |
| 7,977,898 B2 | 7/2011 | Jang et al. | |
| 9,548,661 B2 | 1/2017 | Ryotaro et al. | |
| 10,222,814 B1 * | 3/2019 | Chakraborty | H02M 1/084 |
| 10,396,673 B1 * | 8/2019 | Presti | H02M 1/38 |
| 10,511,226 B1 * | 12/2019 | Gurlahosur | H02M 3/1584 |
| 2002/0125869 A1 * | 9/2002 | Groom | H02M 3/1584 323/283 |
| 2003/0185024 A1 * | 10/2003 | Lethellier | H02J 1/102 363/65 |

(Continued)

FOREIGN PATENT DOCUMENTS

| | | |
|---|---|---|
| CN | 107863882 A | 3/2018 |
| DE | 102009027307 A1 | 4/2010 |

OTHER PUBLICATIONS

German Patent and Trademark Office, German Search Report for the corresponding German Patent Application No. DE 10 2019 216 381.5 dated Mar. 12, 2021.

*Primary Examiner* — Thienvu V Tran
*Assistant Examiner* — Shahzeb K Ahmad
(74) *Attorney, Agent, or Firm* — Brooks Kushman P.C.

(57) ABSTRACT

Systems and methods for balancing phase currents of the phases of a multiphase converter include alternately connecting the phases during respective intervals to an input current and sampling, at a node of the multiphase converter that is common to the phases, the input current provided to the phases to obtain respective input current samples for the phases. While the input current samples are unequal, the intervals are adjusted to minimize inequality of the input current samples and thereby balance the phase currents.

17 Claims, 4 Drawing Sheets

(56) References Cited

U.S. PATENT DOCUMENTS

| | | | |
|---|---|---|---|
| 2004/0041543 A1* | 3/2004 | Brooks | H02M 3/1584 323/212 |
| 2006/0015274 A1* | 1/2006 | Trandafir | H02M 3/157 702/64 |
| 2008/0203985 A1* | 8/2008 | Dong | H02M 3/157 323/272 |
| 2009/0167080 A1 | 7/2009 | Carpenter et al. | |
| 2013/0194848 A1 | 8/2013 | Bernardinis et al. | |
| 2014/0223949 A1* | 8/2014 | Sakae | H02M 3/1584 62/324.1 |
| 2014/0253066 A1* | 9/2014 | Teh | H02M 3/1584 323/272 |
| 2015/0288285 A1* | 10/2015 | Paul | H02M 3/158 323/271 |
| 2015/0333629 A1* | 11/2015 | Jang | H02M 3/1584 323/271 |
| 2016/0013721 A1* | 1/2016 | Soto | H02M 1/14 323/271 |
| 2017/0141684 A1 | 5/2017 | Beck | |
| 2018/0226891 A1 | 8/2018 | Zhang | |
| 2019/0129456 A1* | 5/2019 | Hsu | G05F 1/575 |

* cited by examiner

SYSTEM AND METHOD FOR BALANCING CURRENT OF CONVERTER PHASES

TECHNICAL FIELD

The present invention relates to balancing phase currents of a multiphase converter.

BACKGROUND

A DC/DC converter converts an input DC voltage to an output DC voltage. The converter includes at least one converter circuit which functions for the converter to convert the input voltage to the output voltage. A "multiphase" converter includes multiple converter circuits. Each converter circuit forms a respective "phase" of the converter.

In operation for the converter to convert an input voltage to an output voltage, a controller switches on the phases at respective intervals over successive switching periods. The intervals are spaced-apart such that only one phase is switched on at a time. Current from the input of the converter flows to a phase while the phase is switched on.

Under the assumption that the electrical components of the phases have the same component values, the controller switches the phases on with the same duty cycle. Consequently, the phases will have the same currents when the components have the same component values.

However, due to the component values differing from tolerance and/or ageing, the behavior of the phases differs, and the phases will have different currents. Traditionally, then, one current-loop control is defined per each phase (i.e., individually controlling each phase current). This, however, requires high CPU processing load at the controller and a greater number of components (e.g., each phase is modified to include its own power shunt and operational amplifier).

It is desirable, then, to have a common, single current loop for all phases. This is to reduce the cost and the CPU load. But, with a common current control, differences in the phases lead to unbalanced phase currents. This results in overstress in the phases that are delivering more current, thus reducing the total converter life.

SUMMARY

A method for balancing phase currents of a plurality of phases of a multiphase converter is provided. The method includes alternately connecting the phases during respective intervals to an input current and sampling, at a node of the multiphase converter that is common to the phases, the input current provided to the phases to obtain respective input current samples for the phases. While the input current samples are unequal, the intervals are adjusted to minimize inequality of the input current samples.

The method may further include generating trigger signals at successive time instants respectively for the phases and sampling the input current provided to the phases occurs at the time instants in response to the trigger signals. Generating the trigger signals may include synchronizing the trigger signals such that a time instant of a trigger signal for a first one of the phases occurs while the first one of the phases is connected to the input current and a time instant of a next succeeding trigger signal for a second one of the phases occurs while the second one of the phases is connected to the input current.

The node of the multiphase converter that is common to the phases may be connected to a DC-link capacitor of the multiphase converter.

Adjusting the intervals may include increasing the interval for a phase having an input current sample lower than an average of the input current samples to increase the input current provided to the phase. Adjusting the intervals may also include decreasing the interval for a phase having an input current sample greater than the average of the input current samples to decrease the input current provided to the phase.

Each phase may include an inductor having a same inductor value and tolerance. The intervals may initially be the same.

A system for balancing phase currents of a plurality of phases of a multiphase converter is provided. The system includes a controller and a current sensor. The controller is configured to alternately connect the phases during respective intervals to an input current. The current sensor is configured to sample, at a node of the multiphase converter that is common to the phases, the input current provided to the phases to obtain respective input current samples for the phases. The controller is further configured to adjust the intervals to minimize inequality of the input current samples.

A converter for converting DC voltage levels includes a plurality of phases, a controller, and a current sensor. The phases are connected in parallel to a common node. The controller is configured to alternately connect the phases during respective intervals to an input current at the common node. The current sensor is connected to the common node and configured to sample the input current provided to the phases to obtain respective input current samples for the phases. The controller is further configured to adjust the intervals to minimize inequality of the input current samples.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
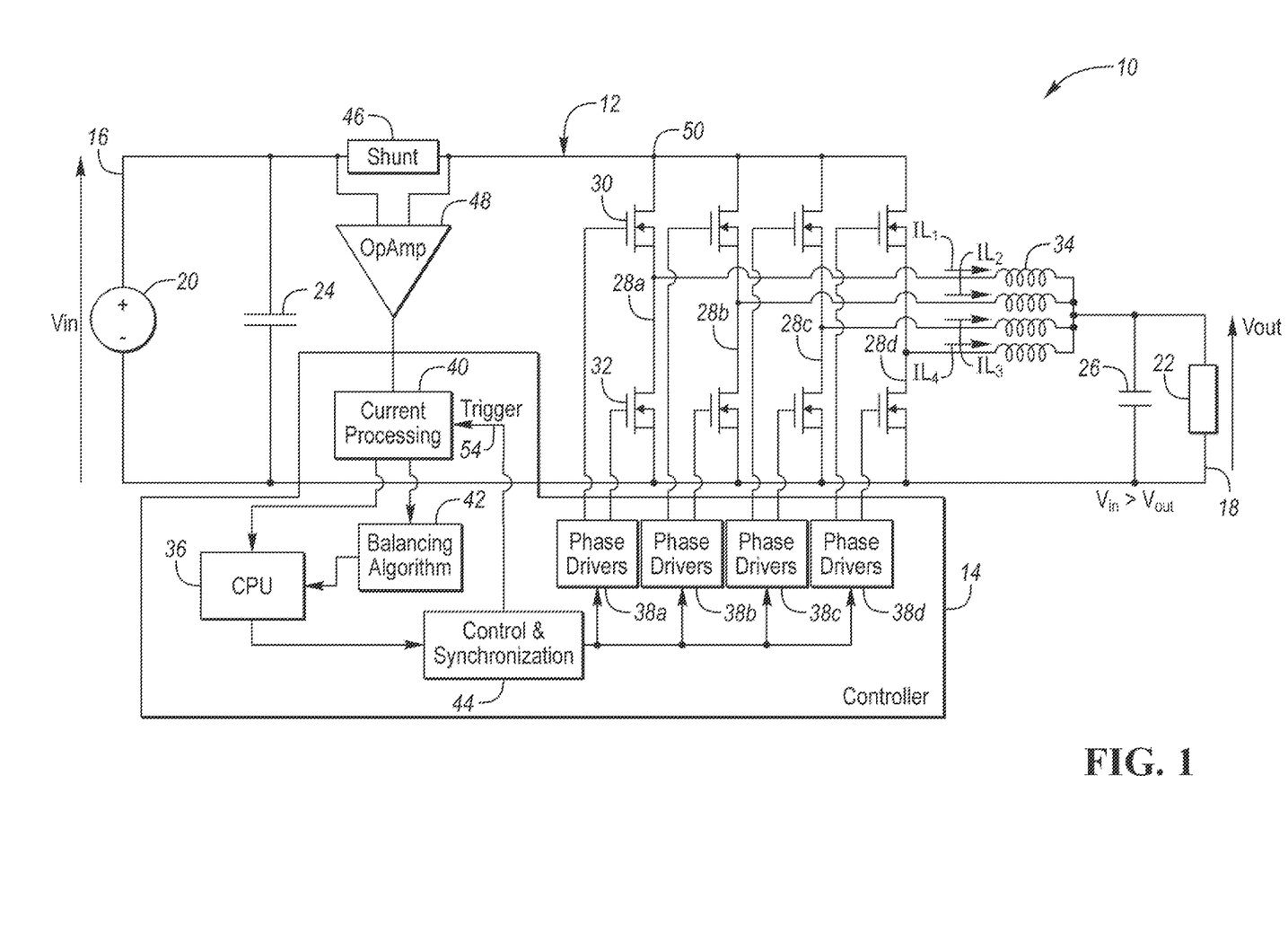
FIG. 1 illustrates a converter system having a multiphase DC/DC converter and an associated controller, a schematic of the converter and a block diagram of the controller being shown in FIG. 1, the converter being depicted in FIG. 1 as a 4-phase converter.

Referring now to FIG. 1, a converter system 10 having a multiphase DC/DC converter 12 and a controller 14 is shown ("DC" stands for direct current). Converter 12 is operable for converting a DC voltage level to another DC voltage level. Controller 14 controls the operation of converter 12 to have the converter convert a DC voltage level to another DC voltage level.

In FIG. 1, a schematic of converter 12 and a block diagram of controller 14 are shown. Converter 12 is an n-phase converter, where n is an integer greater than one. As an example, converter 12 is depicted in FIG. 1 as being a 4-phase converter.

An input 16 of converter 12 is connected to a DC voltage source 20. An output 18 of converter 12 is connected to a load 22. Converter 12 includes a DC-link capacitor 24 connected in parallel to DC voltage source 20. DC-link capacitor 24 is thus part of input 16 of converter 12. Converter 12 includes an output capacitor 26 connected in parallel to load 22. Output capacitor 26 is thus part of output 18 of converter 12.

Converter 12 includes multiple "phases" (i.e., the converter is a "multiphase converter"). Each phase is a converter circuit. The phases (i.e., the converter circuits) function for converter 12 to convert an input DC voltage into an output DC voltage. Converter 12 includes four phases as the converter as shown in FIG. 1 is a 4-phase converter. The four phases include a first phase 28a, a second phase 28b, a third phase 28c, and a fourth phase 28d (collectively "phases 28"). Phases 28 are connected in parallel between input 16 and output 18 of converter 12. The parallel connection of phases 28 is used to share power transference, resulting in component size reduction and efficiency (cost improvement).

Phases 28 have the same layout. Thus, for brevity, only the layout of first phase 28a will be described in further detail. First phase 28a includes a switch arrangement connected in parallel with DC-link capacitor 24. The switch arrangement includes a first (upper) switch 30 and a second (lower) switch 32. Switches 30 and 32 are connected in series. Switches 30 and 32 are semiconductor devices (e.g., transistors such as MOSFETs as indicated in FIG. 1). As known to those of ordinary skill in the art, lower switch 32 is used in place of a diode to provide synchronous rectification. First phase 28a further includes an inductor 34. Inductor 34 is electrically connected at one end between serially-connected switches 30 and 32 and at another end to output 18 of converter 12. Thus, as described and as illustrated in FIG. 1, phases 28 each include their own switch arrangement having first and second switches 30 and 32 and their own inductor 34.

Controller 14 controls the operation of phases 28 for converter 12 to convert an input DC voltage at input 16 of the converter to an output DC voltage at output 18 of the converter. Particularly, controller 14 controls the switches 30 and 32 of phases 28 to turn on the phases at respective intervals over successive switching periods. The intervals are spaced-apart such that only one phase is turned on at a time (e.g., second phase 28b, third phase 28c, and fourth phase 28d are turned off while first phase 28a is turned on; first phase 28a, third phase 28c, and fourth phase 28d are turned off while second phase 28b is turned on; etc.).

This "turned on" and "turn off" of phases 28 is in relation to input 16 of converter 12. Particularly, upper switch 30 of a phase is switched on and lower switch 32 of the phase is switched off while the phase is turned on. Current from input 16 flows to a phase while the phase is turned on. Conversely, lower switch 32 of a phase is switched on and upper switch 30 of the phase is switched off while the phase is turned off. Current from input 16 does not flow to a phase while the phase is turned off. The current flowing through a phase while the phase is turned off is the current from the inductor of the phase.

In sum, the current from input 16 flowing to a phase while the phase is turned on with the other phases being turned off is the current flowing through the phase (i.e., the input current=the phase current; $i_{input}=i_{phase}$).

In one type of operation, controller 14 controls the operation of phases 28 for converter 12 to convert a high DC input voltage at input 16 of the converter to a low DC output voltage at output 18 of the converter. As such, converter 12 is a step-down or "buck" converter. For example, DC voltage source 20 at input 16 is a 48 VDC voltage source and the output DC voltage at output 18 is to be a 12 VDC voltage output. Controller 14 controls the operation of phases 28 for converter 12 to convert the 48 VDC voltage input to the 12 VDC voltage output.

Converter 12 is bi-directional. Thus, output 18 may be the "input" of converter 12 and input 16 may be the "output" of the converter. In this case, controller 14 controls the operation of phases 28 for converter 12 to convert a low DC input voltage at output 18 to a high DC output voltage at input 16. As such, converter 12 is a step-up or "boost" converter. For example, a DC voltage source at output 18 is a 12 VDC voltage source and the output DC voltage at input 16 is to be a 48 VDC voltage output. Controller 14 controls the operation of phases 28 for converter 12 to convert the 12 VDC input voltage at output 18 to the 48 VDC output voltage at input 16. The 12 VDC and 48 VDC values are strictly examples. As described herein, converter 12 may be operated as a more general buck-boost converter for any but practically limited voltage conversion.

As indicated in FIG. 1, controller 14 includes various electrical processors, circuits, drivers, etc. for carrying out various control functions. Particularly, controller 14 includes a central processing unit (CPU) 36 which functions as a central command and processing point. Controller 14 further includes a plurality of phase drivers 38a, 38b, 38c, and 38d (collectively "phase drivers 38"). Phase drivers 38 are respectively associated with phases 28. Phase driver 38a drives switches 30 and 32 of first phase 28a to turn these switches on and off; phase driver 38b drives switches 30 and 32 of second phase 28b to turn these switches on and off; etc.

As described above, phases 28 include their own switch arrangement having first and second switches 30 and 32 and their own inductor 34. As phases 28 have the same layout, inductors 34 of the phases have the same given inductor value and tolerance (e.g., "x" Henrys ±5%). (In other embodiments, inductors 34 of phases 28 are designed with different inductor values with appropriate control being implemented by controller 14 to account for the different inductor values while controlling the operation of the phases for converter 12 to convert voltages.)

Under the assumption that inductors 34 have the same inductor value, controller 14 switches phases 28 on with the same duty cycle in controlling the operation of the phases for converter 12 to convert voltages. (The duty cycle is the duration of an interval that a phase 28 is turned on relative to the duration of a switching period for all the phases.)

Phases 28 turned on with the same duty cycle have the same (i.e., balanced) currents when inductors 34 have the same inductor value.

However, due to different component values (e.g., tolerance) and/or aging, inductors 34 have different inductor values. Consequently, phases 28 will have different (i.e., unbalanced) currents while controller 14 switches phases 28 on with the same duty cycle. What is needed is for controller 14 to individually adjust the duty cycles to switch phases 28 on with different duty cycles so that the phases will have balanced currents when inductors 34 have different inductor values. The durations of the different duty cycles are to be appropriately adjusted individually for phases 28 to have balanced currents.

In accordance with embodiments of the present invention, converter system 10 includes further features and aspects which function to balance the current of phases 28 of converter 12 while the converter is converting voltage levels. These features and aspects function to have controller 14 switch phases 28 on with different duty cycles so that the phases will have balanced currents when inductors 34 have different inductor values (i.e., the phase currents will be balanced even though the behavior of the phases differ from one another).

In this regard, converter 12 further includes a current shunt 46 and an associated operational amplifier 48 and controller 14 further includes a current processor 40, a balancing algorithm processor 42, and a control & synchronization ("C&S") processor 42. Current shunt 46 is connected at one end to input 16 of connector 12 and is connected at another end to a common node 50 of phases 28. Thus, current from input 16 (i.e., "the input current") flowing to a phase 28 while the phase is turned on (and while the other phases are turned off) flows through current shunt 46 and then flows through phase 28. That is, the input current flows through current shunt 46 and then flows through phase 28. No other current flows through phase 28 during this time. Thus, the input current, the current flowing through current shunt 46, and the current flowing through phase 28 are the same current. Accordingly, the current flowing through current shunt 46 is the same as each of the input current and the current flowing through phase 28 (i.e., $i_{input} = i_{shunt} = i_{phase}$). Amplifier 48 is arranged to generate a voltage signal indicative of the current flowing through current shunt 46.

Controller 14 is arranged to receive from amplifier 48 the voltage signal indicative of the current flowing through current shunt 46. Particularly, current processor 40 is in communication with amplifier 48 to receive this voltage signal. Current processor 40 processes this voltage signal to determine a value of the current flowing through current shunt 46. Current processor 40 provides this value to CPU 36. As noted, the current flowing through current shunt 46 is the current flowing through a given phase 28 while the phase is turned on (and while the other phases are turned off). Further, this current is the input current inputted from input 16 of converter 12 to the given phase 28. Accordingly, the value of the current flowing through current shunt 46 is the value of the input current inputted to the given phase 28 and the value of the current flowing through the given phase.

Figure 2A:
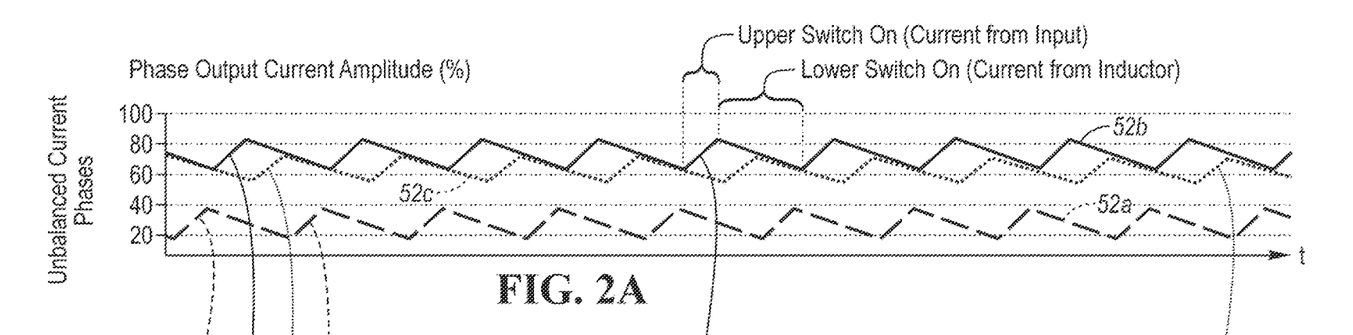
FIG. 2A illustrates a graph depicting a simulation of unbalanced currents of the phases of the converter over a given time, the converter being a 3-phase converter having three unbalanced phase currents in this simulation.
Figure 2B:
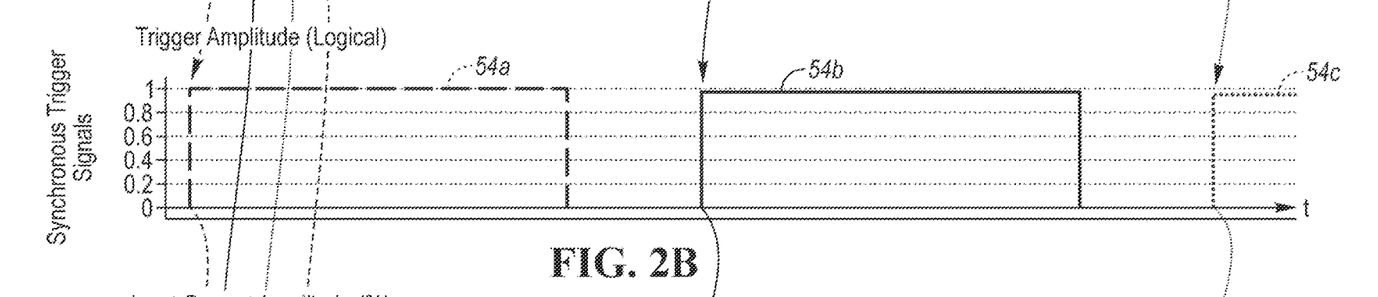
FIG. 2B illustrates a graph depicting synchronous trigger signals generated by the controller for sampling the input currents from the input of the converter respectively inputted to the phases of the converter at respective time instants over the given time.
Figure 2C:
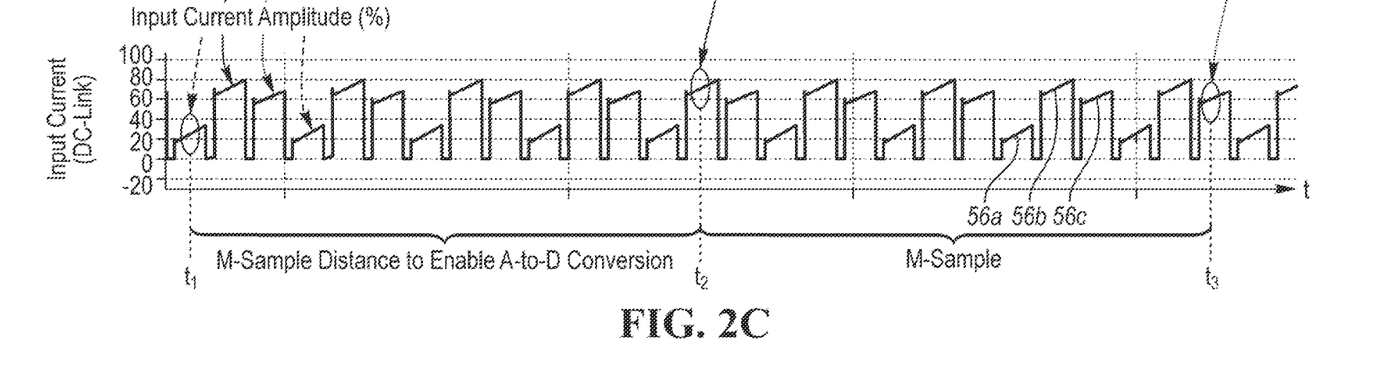
FIG. 2C illustrates a graph depicting the input currents respectively inputted to the phases of the converter over the given time.

Referring now to FIGS. 2A, 2B, 2C, with continual reference to FIG. 1, operation carried out by converter system 10 in accordance with embodiments of the present invention to balance the current of phases 28 of converter 12 while the converter is converting voltage levels will be described. For simplicity, FIGS. 2A, 2B, and 2C are based on converter 12 being a 3-phase converter (e.g., the converter having only first, second, and third phases 28a, 28b, and 28c).

FIG. 2A illustrates a graph depicting a simulation of unbalanced phase currents over a given time. (A "phase current" is the current flowing through a phase.) The unbalanced phase currents include a first phase current 52a of first phase 28a, a second phase current 52b of second phase 28c, and a third phase current 52c of third phase 28c. As shown in FIG. 2A, phase currents 52a, 52b, 52c (collectively "phase currents 52") are unbalanced (i.e., two or more phase currents have different values at given time instants). Operation carried out by converter system 10 causes phase currents 52 to be balanced (i.e., the phase currents will have substantially the same value all the time) during steady-state.

FIG. 2B illustrates a graph depicting synchronous trigger signals generated by controller 14 for sampling the input currents respectively inputted from input 16 of converter 12 to phases 28 at respective time instants over the given time; and FIG. 2C illustrates a graph depicting the input currents respectively inputted to phases 28 over the given time.

As shown in the graph of FIG. 2C, the input currents include a first input current 56a, a second input current 56b, and a third input current 56c (collectively "input currents 56"). As described herein, controller 14 alternately switches on phases 28 to cause first input current 56a to flow to first phase 28a during a first interval, second input current 56b to flow to second phase 28b during a second interval, and third input current 56c to flow to third phase 28c during a third interval. The intervals are spaced-apart such that only one of input currents 56 flows to a phase 28 at a time. As indicated by input currents 56 having the same width along the time axis of the graph in FIG. 2C, the intervals have the same duration. As such, the duty cycle is the same for all phases 28. The first, second, and third intervals occur during a switching period and, as indicated by the repeating pattern of input currents 56, the switching period continually repeats.

As the duty cycles are the same, phase currents 52 would be balanced if phases 28 behaved the same (e.g., if inductors 34 had the same inductor value). However, phase currents 52 are unbalanced as shown in the graph of FIG. 2A due to phases 28 behaving differently. The same duty cycles for differently behaving phases 28 result in the unbalanced phase currents such as shown in the graph of FIG. 2A.

As noted above, controller 14 operates to individually adjust the duty cycles to switch phases 28 on with different duty cycles so that the phases have balanced currents when the phases behave differently. The synchronous trigger signals generated by controller 14 for sampling input currents 56 are part of this operation. As shown in the graph of FIG. 2B, the trigger signals include a first trigger signal 54a, a second trigger signal 54b, and a third trigger signal 54c (collectively "trigger signals 54"). C&S processor 44 of controller 14, under the command of CPU 36 of the controller, alternately generates trigger signals 54. C&S processor 44 alternately generates trigger signals 54 in conjunction with the switching of phases 28 according to a schedule determined by the CPU. The schedule is customized to provide a long enough duration to allow analog-to-digital processing conversion of sampled input currents 56.

Current processor 40 of controller 14 receives trigger signals 54 as they are generated. Upon receiving a trigger signal 54, current processor 40 samples the voltage signal being generated by amplifier 48 of converter 12. As described herein, this voltage signal is indicative of the current flowing through current shunt 46; the current flowing through the current shunt is equal to each of the input current and the phase current; and thus, this voltage signal is also indicative of each of the input current and the phase current. In this way, input currents 56 are sampled.

As shown in FIG. 2B in conjunction with FIG. 2C, first trigger signal 54a is for sampling first input current 56a inputted to first phase 28a at a first time instant $t_1$, second trigger signal 54b is for sampling second input current 56b inputted to second phase 28b at a second time instant $t_2$, and third trigger signal 54c is for sampling third input current 56c inputted to third phase 28c at a third time instant $t_3$. The values of sampled input currents 56 include a first value of first input current 56a at the first time instant $t_1$, a second value of second input current 56b at the second time instant $t_2$, and a third value of third input current 56c at the third time instant $t_3$.

Current processor 40 provides the values of sampled input currents 56 to CPU 36 and balancing algorithm processor 42 of controller 14. As described, the first value of first input current 56a is the value of phase current 52a of first phase 28a; the second value of second input current 56b is the value of phase current 52b of second phase 28b; and the third value of third input current 56c is the value of phase current 52c of third phase 28c.

Balancing algorithm processor 42 processes the values of phase currents 52 to determine how to balance the phase currents when they are unbalanced. For example, balancing algorithm processor 42 determines an average of the values of phase currents 52 and determines the difference from the average for the phase currents. The difference from the average for each phase current 52 is to be added or subtracted for that phase current to be at the average. For example, if the first, second, and third phase currents 52a, 52b, and 52c respectively have the values of 33, 42, and 45 amps, then the average is 40 amps ((33+42+45)/3=40). Accordingly, for phases currents 52 to be balanced, first phase current 52a having the value of 33 amps is to be increased by 7 amps; second phase current 52b having the value of 42 amps is to be decreased by 2 amps; and third phase current 52c having the value of 45 amps is to be decreased by 5 amps. Upon these changes being made, phase currents 52 will all be 40 amps and therefore will be balanced.

Balancing algorithm processor 42 provides its determination on how to balance phase currents 52 to CPU 36. CPU 36 adjusts duty cycles individually for phases 28 to balance phase currents 52. As described herein, the duty cycle is the duration during which the input current flows to a phase. A larger duty cycle generates more input current whereas a smaller duty cycle generates less input current. Thus, a larger duty cycle results in more input current flowing to a phase whereas a smaller duty cycle results in less input current flowing to the phase. CPU 36 individually adjusts the duty cycles for phases 28 to either increase or decrease (or maintain) the input currents flowing to the phases. CPU 36 determines the duty cycle adjustments which will result in phases 28 having balanced phase currents 52.

For instance, in the example above where first, second, and third phase currents 52a, 52b, and 52c respectively have the values of 33, 42, and 45 amps, CPU 36 increases the duty cycle for first input current 56a so that the value of first phase current 52a increases from 33 to 40 amps; slightly decreases the duty cycle for second input current 56b so that the value of second phase current 52b decreases from 42 to 40 amps; and decreases the duty cycle for third input current 56c so that the value of third phase current 52c decreases from 45 to 40 amps. In this way, phases 28 are respectively associated with individualized input current duty cycles so that the phase currents 52 will be balanced.

CPU 36 provides commands indicative of the individualized input current duty cycles to C&S processor 44. C&S processor 44 controls phase drivers 38 accordingly to implement the individualized input current duty cycles.

Figure 3:
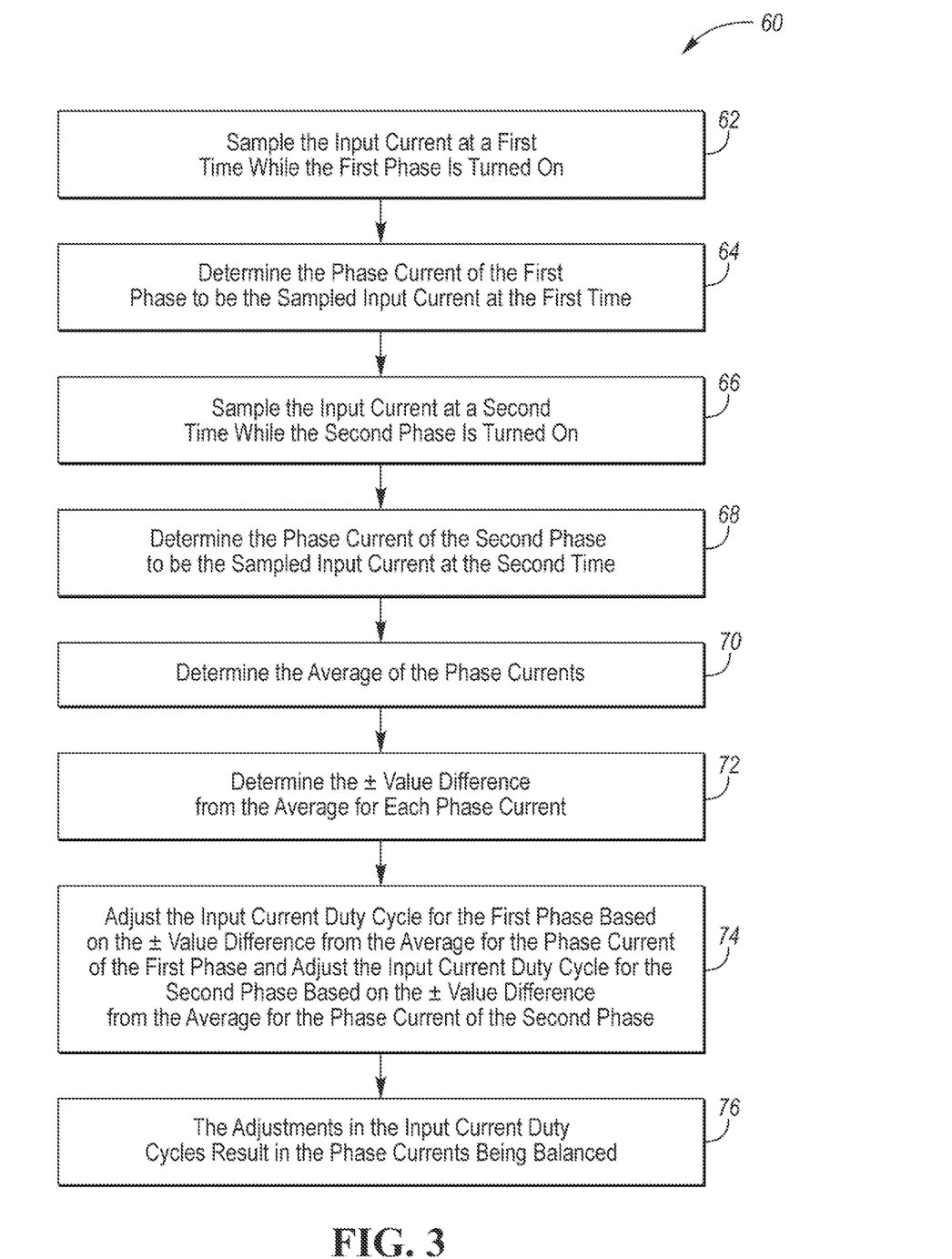
FIG. 3 illustrates a flowchart depicting operation of a system and method for balancing the currents of the phases of the converter.

Referring now to FIG. 3, with continual reference to FIGS. 1, 2A, 2B, and 2C, a flowchart 60 depicting operation of a system and method for balancing phase currents 52 is shown. For simplicity, the operation of flowchart 60 is based on a 2-phase converter having first phase 28a and second phase 28b. The operation begins with the input current being sampled at a first time $t_1$ while first phase 28a is turned on, as indicated in block 62. The phase current of first phase 28a is determined to be the sampled input current at the first time $t_1$ (i.e., $i_{phase1}=i_{input\_t1}$), as indicated in block 64. The input current is then sampled at a second time $t_2$ while second phase 28b is turned on, as indicated in block 66. The phase current of second phase 28b is determined to be the sampled input current at the second time $t_2$ (i.e., $i_{phase2}=i_{input\_t2}$) as indicated in block 68.

The average of the phase currents is determined, as indicated in block 70. The ±value difference from the average for each of the phase current of first phase 28a and the phase current of second phase 28b determined, as indicated in block 72. The input current duty cycle for first phase 28a is adjusted based on the ±value difference from the average for the phase current of the first phase and the input current duty cycle for second phase 28b is adjusted based on the ±value difference from the average for the phase current of the second phase, as indicated in block 74. The adjustments in the input current duty cycles result in the phase currents being balanced (i.e., $i_{phase1}=i_{phase2}$), as indicated in block 76.

Figure 4:
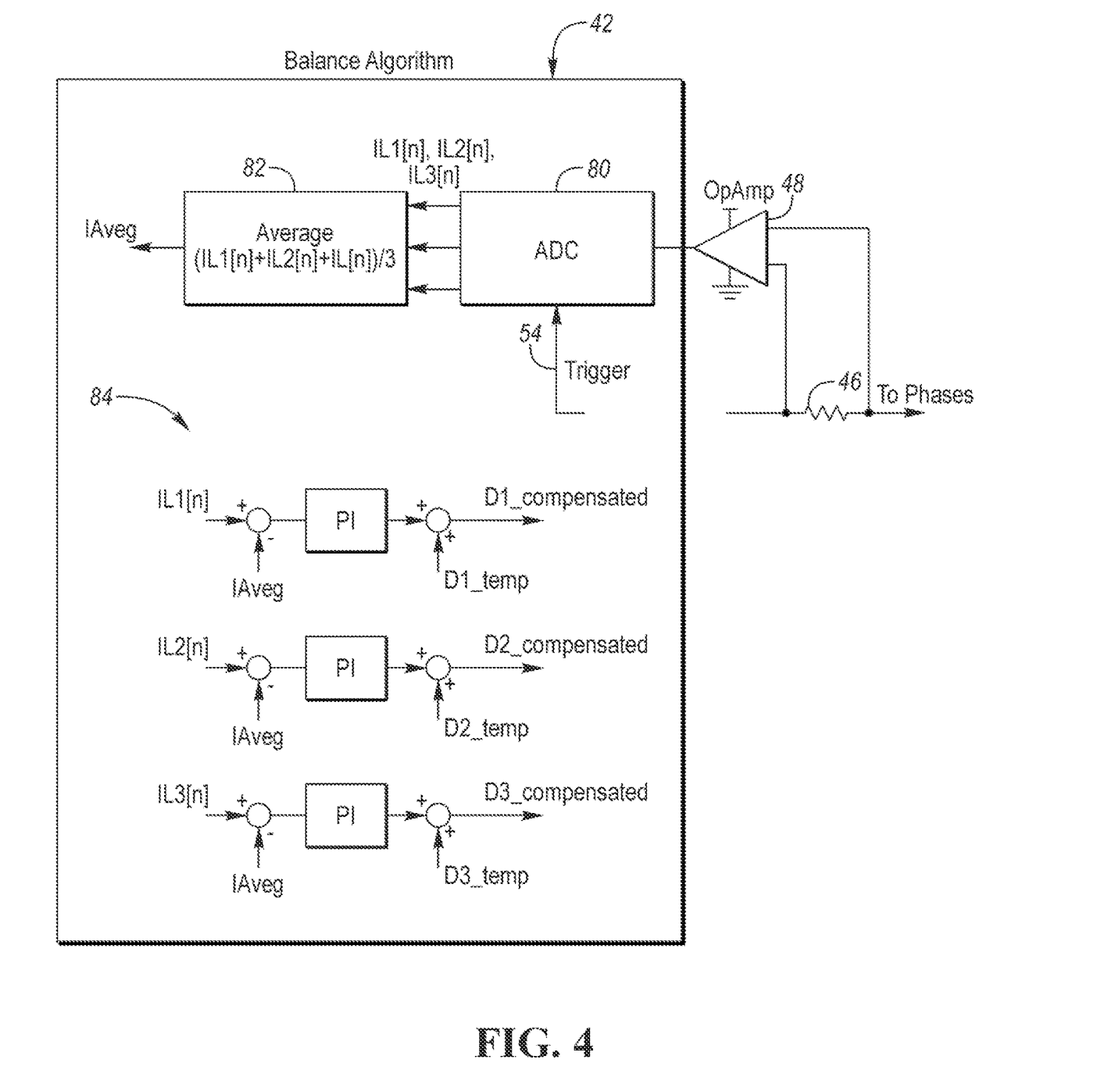
FIG. 4 illustrates a block diagram depicting operation of the balance algorithm processor of the controller for balancing the currents of the phases of the converter.

Referring now to FIG. 4, with continual reference to FIG. 1, a block diagram depicting operation of balance algorithm processor 42 of controller 14 for balancing the currents of phases 28 of converter 12 is shown. As shown in FIG. 4, balance algorithm processor 42 includes an analog-to-digital converter (ADC) 80 and a calculator 82. ADC 80 samples the input currents in response to receiving the trigger signals from C&S processor 44 of controller 14. ADC 80 provides the sampled input currents to calculator 82. Calculator 82 determines an average of the sampled input currents. As described herein, the sampled input currents are the phase currents, respectively, at the time the sampled input currents are sampled.

As shown in FIG. 4, balance algorithm processor 42 further includes circuitry such as proportional integral (PI) devices, generally indicated that 84, for determining how the input current duty cycles should be adjusted so that the phase currents will become balanced. This circuitry may be alternatively a part of CPU 36 for the CPU to make these determinations as has been described above.

With reference to FIGS. 2B and 2C, the balance algorithm is executed in a slow cycle. The sampling of the currents is every "m" cycles to allow for ADC 80 to process each sample. The balancing algorithm may be executed after "2m" cycles of the current since there is one sample for each of the multiple currents sampled. Duty cycle tuning is not higher than ±1% to avoid instabilities (fine tuning). The balancing is used in steady-state, one start-up is finished.

As described, systems and methods to avoid unbalancing currents between phases in accordance with embodiments of the present invention employ a common current loop having current shunt. The systems and methods provide a novel measurement and processing algorithm which takes the synchronization from each phase activation signal to selectively sample the common current measurement. The synchronized samples enable identifying each phase share and the required adjustment of each phase duty cycle ratio. As further described, the measurement is done at the high-voltage side of the multiphase converter, which is in series with a DC-link capacitor. Only one current shunt sensor and only one operational amplifier, as opposed to respective current shunt sensors and operational amplifiers of the multiple phases, is employed by the systems and methods. As further described, the systems and methods use the current shunt sensor to control the total current (power) flow together with the phase balancing.

Benefits of systems and methods to avoid unbalancing currents between phases in accordance with embodiments of the present invention include the following. A single current loop which results in a smaller, cheaper system. The smaller, cheaper system can have just one current shunt sensor and one operational amplifier and therefore can have less components to place in the printed circuit board (PCB). Less CPU load requirements as a relatively little more complex algorithm is simpler than three separate and parallel processing flows. This makes available the option for a smaller (cheaper) controller. The multiphase converter has higher efficiency due to less losses. The high-voltage input stage has lower current than low-voltage output stages (approximately 4-times for 48V-12V converter). Thus, with same resistance (accuracy) shunt power dissipation (I2R) is smaller in the input stage than in the n-phases output (combined). Balanced phase aging, like in the traditional system with one current control loop per phase, is a benefit. The method and system can be used in other switched systems like on-board chargers (OBC) or inverters, provided they use a multi-phase strategy.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for balancing phase currents of a plurality of phases of a multiphase converter, the method comprising:
   alternately connecting the phases during respective intervals to an input current;
   generating trigger signals at successive time instants respectively for the phases, wherein the trigger signals are synchronous in that the trigger signals are generated at a same time following the connection of the phases to the input current;
   sampling, at the time instants in response to the trigger signals, at a node of the multiphase converter that is common to the phases, the input current provided to the phases to obtain respective input current samples for the phases; and
   while the input current samples are unequal, adjusting the intervals based only on differences between the input current samples to minimize inequality of the input current samples.

2. The method of claim 1 wherein:
the node of the multiphase converter that is common to the phases is connected to a DC-link capacitor of the multiphase converter.

3. The method of claim 1 wherein:
adjusting the intervals includes increasing the interval for a phase having an input current sample lower than an average of the input current samples to increase the input current provided to the phase; and
adjusting the intervals includes decreasing the interval for a phase having an input current sample greater than the average of the input current samples to decrease the input current provided to the phase.

4. The method of claim 1 wherein:
each phase includes an inductor, the inductors of the phases have a same inductor value and tolerance.

5. The method of claim 1 wherein:
the intervals initially are the same.

6. The method of claim 1 wherein:
each time instant at which a corresponding trigger signal is generated occurs after M cycles of the phases have been alternately connected to the input current, wherein M is an integer greater than one.

7. A system for balancing phase currents of a plurality of phases of a multiphase converter, the system comprising:
   a controller configured to alternately connect the phases during respective intervals to an input current from a power source and to generate trigger signals at successive time instants respectively for the phases, wherein the trigger signals are synchronous in that the trigger signals are generated at a same time following the connection of the phases to the input current;
   a current sensor configured to sample, at the time instants in response to the trigger signals, at a node of the multiphase converter that is common to the phases, the input current provided to the phases to obtain respective input current samples for the phases, wherein the current sensor includes a current shunt connected in series between the power source and the node; and
   wherein the controller is further configured to adjust the intervals based only on differences between the input current samples to minimize inequality of the input current samples.

8. The system of claim 7 wherein:
the node of the multiphase converter that is common to the phases is connected to a DC-link capacitor of the multiphase converter.

9. The system of claim 7 wherein:
the controller is further configured to adjust the intervals includes increasing the interval for a phase having an input current sample lower than an average of the input current samples to increase the input current provided to the phase; and
the controller is further configured to adjust the intervals includes decreasing the interval for a phase having an input current sample greater than the average of the input current samples to decrease the input current provided to the phase.

10. The system of claim 7 wherein:
each phase includes an inductor, the inductors of the phases have a same inductor value and tolerance.

11. The system of claim 7 wherein:
the intervals initially are the same.

12. The system of claim 7 wherein:
each time instant at which a corresponding trigger signal is generated occurs after M cycles of the phases have been alternately connected to the input current, wherein M is an integer greater than one.

13. A converter for converting DC voltage levels, comprising:
- a plurality of phases connected in parallel to a common node;
- a power source configured to provide an input current to the common node;
- a controller configured to alternately connect the phases during respective intervals to the input current at the common node and to generate trigger signals at successive time instants respectively for the phases, wherein the trigger signals are synchronous in that the trigger signals are generated at a same time following the connection of the phases to the input current;
- a current sensor having a current shunt connected in series between the power source and the common node, the current sensor configured to sample, at the time instants in response to the trigger signals, the input current provided to the phases to obtain respective input current samples for the phases; and
- the controller is further configured to adjust the intervals based only on differences between the input current samples to minimize inequality of the input current samples.

14. The converter of claim 13 further comprising:
a DC-link capacitor connected to the common node.

15. The converter of claim 13 wherein:
the controller is further configured to adjust the intervals includes increasing the interval for a phase having an input current sample lower than an average of the input current samples to increase the input current provided to the phase; and
the controller is further configured to adjust the intervals includes decreasing the interval for a phase having an input current sample greater than the average of the input current samples to decrease the input current provided to the phase.

16. The converter of claim 13 wherein:
each phase includes an inductor, the inductors of the phases have a same inductor value and tolerance.

17. The converter of claim 13 wherein:
each time instant at which a corresponding trigger signal is generated occurs after M cycles of the phases have been alternately connected to the input current, wherein M is an integer greater than one.

* * * * *